United States Patent
Son et al.

(10) Patent No.: US 10,762,476 B2
(45) Date of Patent: Sep. 1, 2020

(54) WIND FARM SUPERVISION MONITORING SYSTEM

(71) Applicant: DOOSAN HEAVY INDUSTRIES & CONSTRUCTION CO., LTD., Changwon-si, Gyeongsangnam-do (KR)

(72) Inventors: Jong Duk Son, Suwon-si (KR); Seung Man Eom, Yongin-si (KR); Jeong Hoon Lee, Daejeon (KR)

(73) Assignee: Doosan Heavy Industries Contruction Co., Ltd, Gyeongsangnam-do (KR)

( * ) Notice: Subject to any disclaimer, the term of this patent is extended or adjusted under 35 U.S.C. 154(b) by 513 days.

(21) Appl. No.: 15/384,746

(22) Filed: Dec. 20, 2016

(65) Prior Publication Data

US 2017/0352010 A1    Dec. 7, 2017

(30) Foreign Application Priority Data

Jun. 2, 2016    (KR) .................. 10-2016-0068887

(51) Int. Cl.
*G06Q 10/06*    (2012.01)
*G06Q 10/10*    (2012.01)
(Continued)

(52) U.S. Cl.
CPC ............. *G06Q 10/20* (2013.01); *F03D 7/048* (2013.01); *F03D 17/00* (2016.05); *F03D 80/50* (2016.05);
(Continued)

(58) Field of Classification Search
CPC ........ G06Q 10/06; G06Q 10/10; G06Q 10/20; F03D 7/02; F03D 7/04
(Continued)

(56) References Cited

U.S. PATENT DOCUMENTS 8,761,948 B1    6/2014  Ippolito et al.
2004/0230377 A1*  11/2004  Ghosh .................. F03D 7/0284
                                                    702/3
(Continued)

FOREIGN PATENT DOCUMENTS

EP    2518309 A2    10/2012
WO    2016077997 A1    5/2016

OTHER PUBLICATIONS

Communication dated Jan. 31, 2017 issued by the Korean Patent Office in counterpart application No. 10-2016-0068887.

(Continued)

*Primary Examiner* — Nga B Nguyen
(74) *Attorney, Agent, or Firm* — Invenstone Patent, LLC

(57) ABSTRACT

A wind farm supervision monitoring system includes: a data collection unit configured to collect data about a status monitoring of each wind turbine from at least one site server; an abnormality status detection unit configured to detect an abnormality status of each wind turbine based on the collected data about the status monitoring and issue an alarm; a wind data management unit configured to early detect a fault of each wind turbine and or monitor performance of each wind turbine based on the data about the status monitoring or the data about the abnormality status; and a supervision unit configured to manage a turbine operation status and operation and maintenance of each wind turbine and provide information for establishing an operation and maintenance plan for the detected abnormality status of the wind turbine.

15 Claims, 13 Drawing Sheets

(51) Int. Cl.
    *F03D 7/02* (2006.01)
    *F03D 7/04* (2006.01)
    *G06Q 10/00* (2012.01)
    *G06F 16/21* (2019.01)
    *G05B 23/02* (2006.01)
    *F03D 17/00* (2016.01)
    *F03D 80/50* (2016.01)
    *G06K 19/06* (2006.01)
    *G06Q 10/08* (2012.01)
    *G06Q 30/00* (2012.01)

(52) U.S. Cl.
    CPC ......... *G05B 23/0283* (2013.01); *G06F 16/21* (2019.01); *G06K 19/06037* (2013.01); *G06Q 10/063114* (2013.01); *G06Q 10/083* (2013.01); *G06Q 10/087* (2013.01); *G06Q 30/01* (2013.01); *F05B 2270/20* (2013.01); *Y04S 10/56* (2013.01); *Y04S 10/60* (2013.01)

(58) Field of Classification Search
    USPC ....................................................... 705/7.15
    See application file for complete search history.

(56) References Cited

U.S. PATENT DOCUMENTS

| | | | | |
|---|---|---|---|---|
| 2010/0280673 | A1* | 11/2010 | Woste | G05B 19/0428 700/287 |
| 2011/0125419 | A1* | 5/2011 | Bechhoefer | F03D 7/047 702/34 |
| 2011/0276828 | A1* | 11/2011 | Tamaki | G05B 23/0254 714/26 |
| 2011/0313726 | A1* | 12/2011 | Parthasarathy | G05B 23/024 702/179 |
| 2012/0143565 | A1* | 6/2012 | Graham, III | G05B 23/0237 702/181 |
| 2012/0290104 | A1* | 11/2012 | Holt | G06Q 10/00 700/29 |
| 2013/0035798 | A1* | 2/2013 | Zhou | F03D 7/0292 700/287 |
| 2013/0253853 | A1* | 9/2013 | Wunderlin | G05B 23/0283 702/42 |
| 2014/0244051 | A1* | 8/2014 | Rollins | B01F 3/04078 700/282 |
| 2015/0101401 | A1* | 4/2015 | Ekanayake | G01W 1/02 73/112.01 |
| 2015/0381443 | A1 | 12/2015 | Du Plessis | |
| 2016/0010628 | A1* | 1/2016 | Dhar | F03D 17/00 702/34 |
| 2016/0155318 | A1* | 6/2016 | Caine | H02S 50/00 340/635 |
| 2017/0205817 | A1* | 7/2017 | Lyons | H04W 4/80 |

OTHER PUBLICATIONS

Communication dated Apr. 4, 2018, from the European Patent Office in counterpart European Application No. 16205597.4.
Smith, "Scada in Wind Farms", The Institution of Electrical Engineers, 1993, XP002940540, pp. 11/1-11/2 (total 2 pages).
Lahiri et al., "Importance of Strategic Maintenance Management for Indian Utility Industry", IEEE, 2008, pp. 1-5.

* cited by examiner

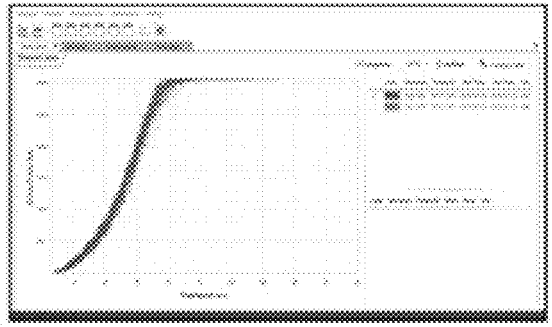 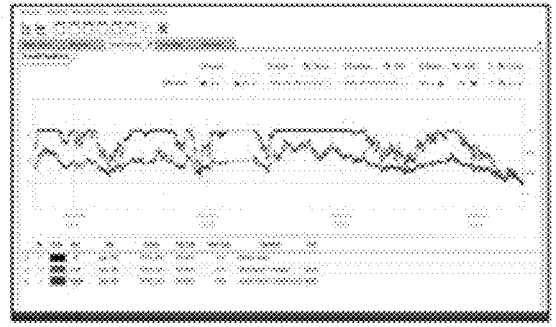
Fig. 12(a) Power Curve  Fig. 12(b) SCADA, CMS Trend
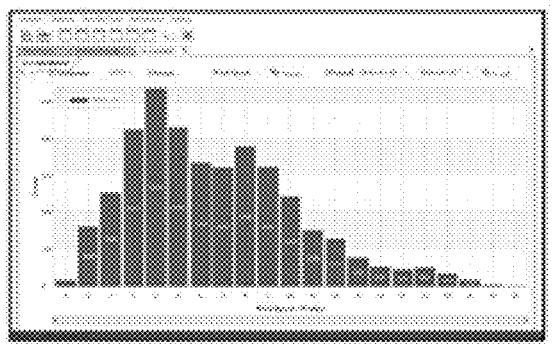 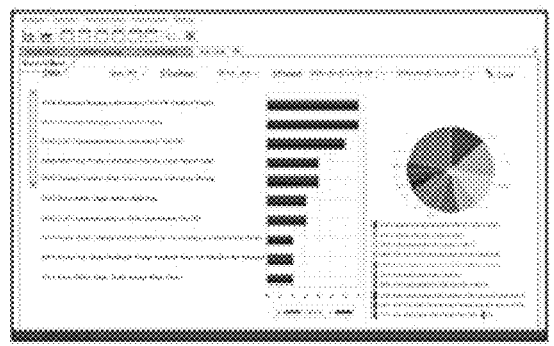
Fig. 12(c) Accumulated Histogram  Fig. 12(d) Error Occurred Number
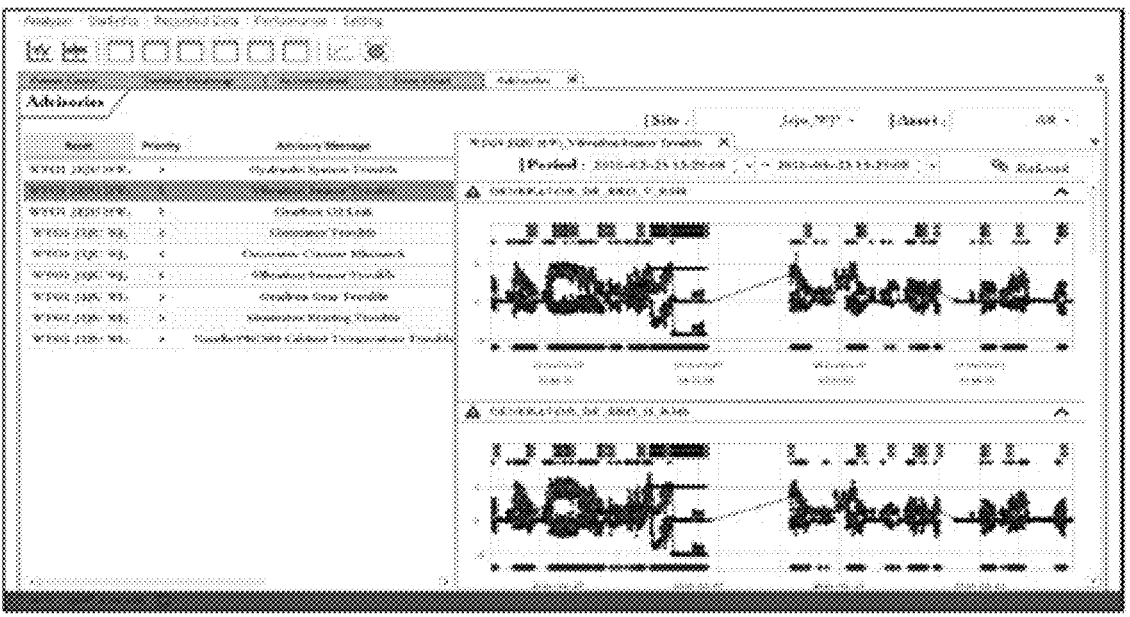
Fig. 12(e) Abnormality Detection

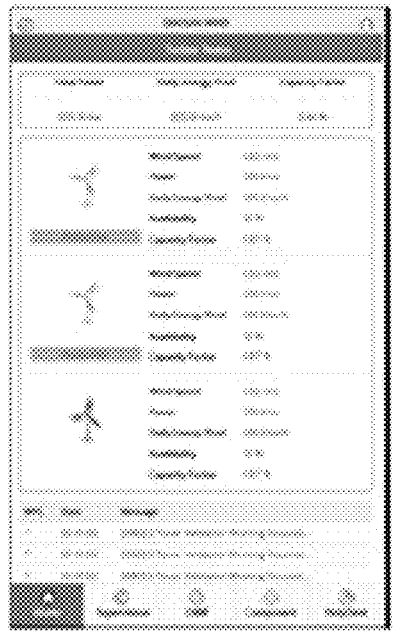
Fig. 13(a) OPERATION STATUS
Fig. 13(b) WORK HISTORY
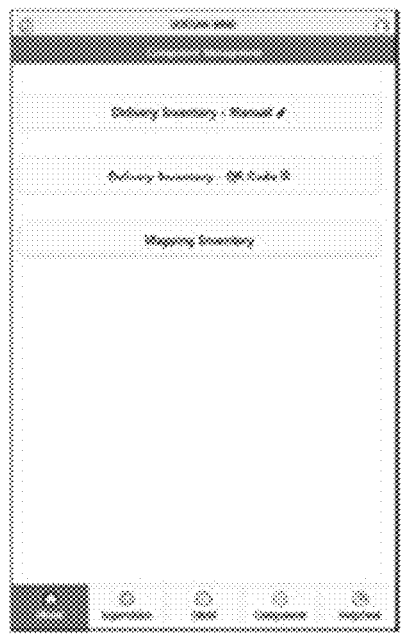
Fig. 13(c) COMPONENT WAREHOUSING
Fig. 13(d) BULLETIN BOARD MESSAGE REGISTRATION

WIND FARM SUPERVISION MONITORING SYSTEM

CROSS-REFERENCE TO RELATED APPLICATION(S)

This application claims priority to Korean Patent Application No(s). 10-2016-0068887 filed on Jun. 2, 2016 the disclosure of which is incorporated herein by reference in its entirety.

BACKGROUND

Field

Exemplary embodiments of the present disclosure relate to a wind farm supervision monitoring system, and more particularly, to a wind farm supervision monitoring system capable of performing operation and maintenance for managing at least one wind farm.

Description of the Related Art

Recently, due to a depletion of fossil energy and environmental problems such as a climate change and a reduction of greenhouse gas, an investment in new renewable energy has been increased and a demand for a wind turbine has also been increased globally.

As such, with the spread of a wind turbine, 3.4% of global power consumption in 2014 is produced by a wind turbine. In 2019, it is expected that the global power consumption will reach 5.3%.

By the way, unlike thermal power plant or nuclear power plant facilities, the wind turbine has a plurality of facilities widely distributed over power generation capacity and is affected by accessibility according to a weather condition, a supply and demand of parts and equipment, the number of workers, or the like when operation and maintenance (O & M) is performed, and therefore is a facility that is difficult to manage.

In particular, in the case of offshore wind generation, since an access to the wind turbine is limited due to a wind speed and a wave height when the wind turbine breaks down, it is essential to establish an operation and maintenance plan for early detecting a breakdown of parts and preventing a critical accident to save the O & M costs.

Recently, an information communication technology (ICT) technology has been developed toward a problem solution by cooperative work, a trend analysis based on analysis of big data, digital interaction and convergence, preference of easy-to-use thing, or the like.

Further, foreign advanced wind turbine makers use the ICT technology to manage a wind facility and construct an ICT system to maximize an operating ratio of a wind farm and minimize the O & M costs.

Therefore, there is a need to construct a differentiated monitoring system capable of providing information that manages an alarm and an event of several wind turbines and establishes an operation and maintenance plan by using an ICT technology.

RELATED ART DOCUMENT

Patent Document

Korean Patent Laid-Open Publication No. 2013-0031815 (Published date: Mar. 29, 2013)

SUMMARY

An object of the present disclosure is to provide a wind farm supervision monitoring system capable of minimizing an influence of accessibility according to a weather condition, a supply and demand of parts and equipment, the number of workers, or the like when operation and maintenance (O & M) for managing at least one wind farm is performed. Another object of the present disclosure is to provide a wind farm supervision monitoring system capable of providing information for managing an alarm and an event of several wind turbines and establishing an operation and maintenance plan by acquiring data from a plurality of wind farms based on a management control data acquisition (SCADA) and a status monitoring system (CMS), sharing a turbine operation status, an operation and maintenance plan and record, customer's requirements, or the like on a web, and performing a cooperative work to early detect a breakdown of parts and prevent a critical accident.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, there is provided a wind farm supervision monitoring system for supervising and managing a plurality of wind farms, in which one wind farm includes at least one wind turbine and a site server acquiring (SCADA) data and monitoring (CMS) a status using a management control for each wind turbine, the wind farm supervision monitoring system including: a data collection unit configured to collect data about the status monitoring of each wind turbine from at least one site server; an abnormality status detection unit configured to detect the abnormality status of each wind turbine based on the collected data about the status monitoring of each wind turbine and issue an alarm; a wind data management unit configured to early detect a fault of each wind turbine and monitor performance of each wind turbine based on data about the status monitoring of each wind turbine provided from the at least one site server or data about the abnormality status of each wind turbine detected by the abnormality status detection unit; and a supervision unit configured to manage a turbine operation status and operation and maintenance of each wind turbine and provide information for establishing an operation and maintenance plan for the detected abnormality status of the wind turbine.

The wind farm supervision monitoring system may further include: a user interface unit configured to visually display locations of each site for the at least one wind farm on a map, display a live turbine operation status, an operating ratio, and availability of each wind turbine by a dashboard menu, display the information on each wind farm by a navigation menu, and display a turbine error of each wind turbine, an early alarm, a work history, a helpdesk function by an alarm & event menu.

For the wind O & M, the supervision unit may perform a function about component/spare management, work plan/actual, cooperative work, manual/guarantee status management, tool/equipment management, and helpdesk reply of each wind turbine.

The supervision unit may collect an early alarm, a weather forecast, and component and tool status information using the SCADA data and the CMS data provided from the at least one site server to establish an operation and maintenance plan, automatically issue a work ticket suggesting a work that the worker needs to perform based on the established maintenance plan, receive a registration of a work record depending on the work ticket, and perform a cooperative work for the customer request and answer of a helpdesk.

Further, for the O & M plan, the supervision unit may determine one of a run to failure that performs maintenance after the operation until a major part breaks, periodic maintenance that periodically performs maintenance for a predetermined period, and status based maintenance that acquires a facility status based on a facility diagnosis technology or a status monitoring technology to early detect a fault and tracks the progress to predict the next progress to thereby perform the operation and maintenance at a specific time.

The dashboard menu may include an estimation function, a status function, and a configuration function, the estimation function may include a management function and a cost function, the status function may include a network function and a repository function, the configuration function may set a wind speed, a wave height, and priority and a threshold value of equipment including a network and a hard disk, and the management function may include a status about the number of turbines, the number of wind farms, the number of countries, the number of failures, mean time to repair (MTTR), and mean time between failure (MTBF), accessibility to each site, spares by site, and periodic maintenance for each turbine.

The supervision unit may perform a control by a component management menu, a mobile application menu, and a configuration menu, for the operation and maintenance, perform a function of inquiring a work history for each part, a component status, a manual, a report card, and a term of guarantee and confirming a location of a component, for the component management menu, provide a supervision, operation and maintenance (O & M), and helpdesk function so that a mobile terminal confirms an operation status of the wind turbine, for the mobile application menu, and provide a location function of adding, modifying, and deleting information on an area, a country, a site, and a turbine, for the configuration menu.

The user interface unit may include an overview menu and a setting menu and the overview menu may represent a collection status of the SCADA and CMS data of the registered turbines using a turbine status function, represent a live system status using a diagnosis function, or start data-linking with a system monitoring and supervision unit using an acquisition start function.

A wind data management unit may manage a live data menu, a recorded data menu, an analysis menu, a statistics menu, and a performance menu.

The live data menu may display live data of the turbine and the recorded data menu may display information corresponding to an error photo and an error trace and display a day counter data, a day counter status data, a total counter data, a total counter status data, and a status message for a PLC status change.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIGS. 12(a) to 12(e) are diagrams illustrating an example of information provided by a data management function according to an embodiment of the present disclosure; and FIGS. 13(a) to 13(d) are diagrams illustrating an example of providing a turbine operation status within a wind farm to a mobile device, according to an embodiment of the present disclosure.

DESCRIPTION OF EXEMPLARY EMBODIMENTS

Figure 1:
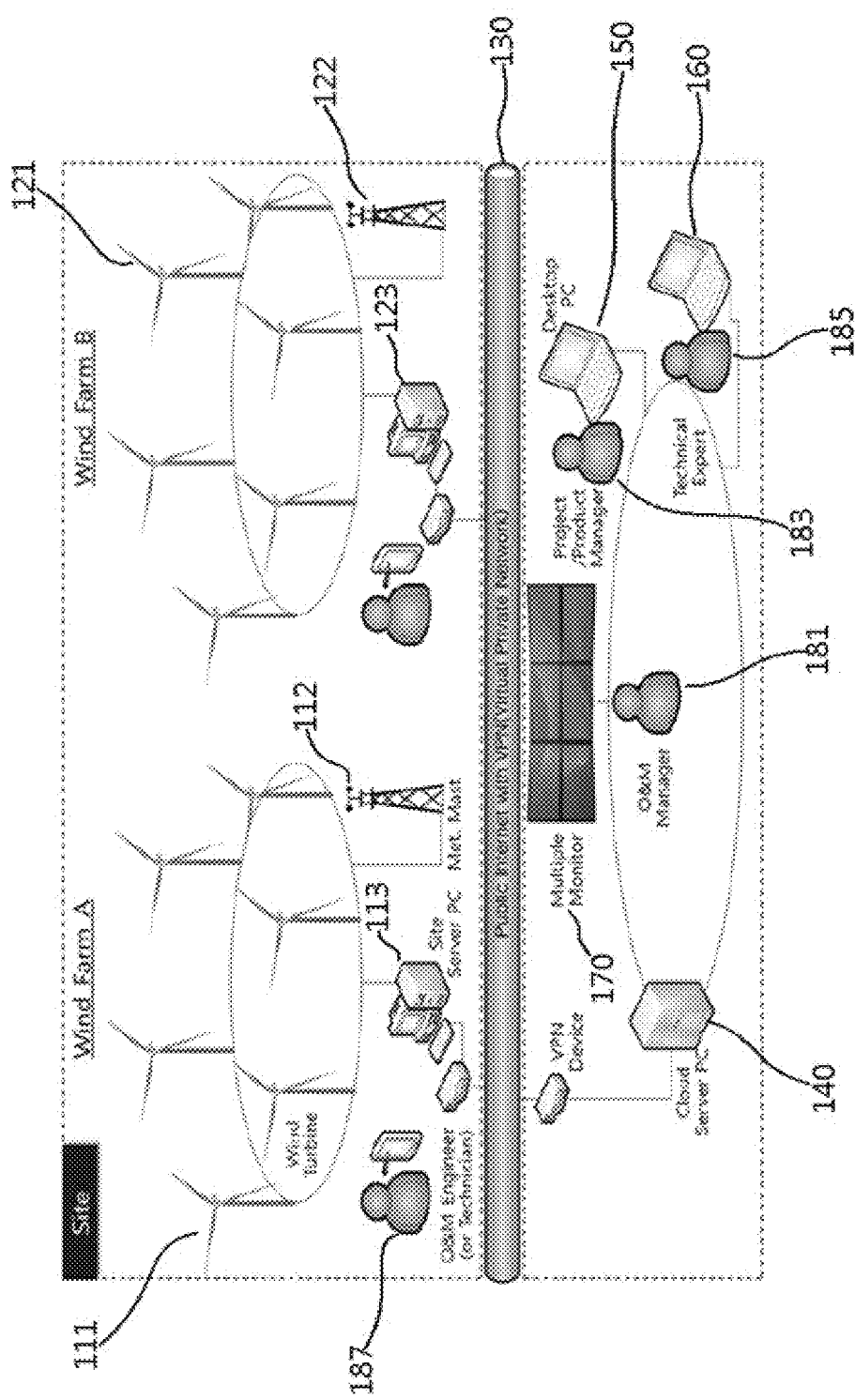
FIG. 1 is a conceptual diagram schematically illustrating a basic configuration of a wind site to which a wind farm supervision monitoring system according to an embodiment of the present disclosure is applied.

Hereinafter, exemplary embodiments of the present disclosure will be described in detail with reference to the accompanying drawings so that those skilled in the art may easily practice the present disclosure. As those skilled in the art would realize, the described embodiments may be modified in various different ways, all without departing from the spirit or scope of the present disclosure.

A part irrelevant to the description will be omitted to clearly describe the present disclosure, and the same elements will be designated by the same reference numerals throughout the specification.

In addition, throughout the present specification, when any one part is referred to as being "connected to" another part, it means that any one part and another part are "directly connected to" each other or are "electrically connected to" each other with the other part interposed therebetween. In addition, unless explicitly described to the contrary, "comprising" any components will be understood to imply the inclusion of other elements rather than the exclusion of any other elements.

The mention that any portion is present "over" another portion means that any portion may be directly formed on another portion or a third portion may be interposed between one portion and another portion. In contrast, the mention that any portion is present "just over" another portion means that a third portion may not be interposed between one portion and another portion.

Terms used throughout the specification, 'first', 'second', 'third', etc. can be used to describe various portions, components, regions, layers, and/or sections but are not limited thereto. These terms are used only to differentiate any portion, component, region, layer, or section from other portions, components, regions, layers, or sections. Therefore, a first portion, component, region, layer, or section which will be described below may be mentioned as a second portion, component, region, layer, or section without departing from the scope of the present disclosure.

Terminologies used herein are to mention only a specific exemplary embodiment, and does not limit the present disclosure. Singular forms used herein include plural forms as long as phrases do not clearly indicate an opposite meaning. A term "including" used in the present specification concretely indicates specific properties, regions, integer numbers, steps, operations, elements, and/or components, and is not to exclude presence or addition of other properties, regions, integer numbers, steps, operations, elements, components, and/or a group thereof.

The term expressing the relative space of "under", "over", and the like may be used to more easily describe the relationship between other portions of one portion which is illustrated in the drawings. The terms intend to include other meanings or operations of apparatuses which are being used along with the intended meaning in the drawings. For example, overturning the apparatus in the drawings, any portions described as being positioned "under" other portions will be described as being positioned "over" other portions. Therefore, the exemplified term "under" includes both of the up and down directions. An apparatus may rotate by 90° or may rotate at different angles and the term expressing a relative space is interpreted accordingly.

All terms including technical terms and scientific terms used herein have the same meaning as the meaning generally understood by those skilled in the art to which the present disclosure pertains unless defined otherwise. Terms defined in a generally used dictionary are additionally interpreted as having the meaning matched to the related art document and the currently disclosed contents and are not interpreted as ideal or formal meaning unless defined.

Hereinafter, exemplary embodiments of the present disclosure so as to be easily practiced by a person skilled in the art to which the present disclosure pertains will be described in detail with reference to the accompanying drawings. However, the present disclosure may be modified in various different ways and is not limited to embodiments provided in the present description.

FIG. 1 is a conceptual diagram schematically illustrating a basic configuration of a wind site to which a wind farm supervision monitoring system according to an embodiment of the present disclosure is applied.

As illustrated in FIG. 1, in the wind farm supervision monitoring system according to the embodiment of the present disclosure, one site includes a plurality of wind farms A and B 110 and 120, in which each wind farm includes at least one wind turbine 111 and 121, Met. Masts 112 and 122, and site servers 113 and 123 that acquire (SCADA) data from the at least one wind turbine 111 and 121 by a management control and monitor (CMS) a status of each wind turbine.

Site servers 113 and 123 monitoring each wind farm may be connected to a cloud server 140, personal computers (PCs) 150 and 160, or the like through a public internet 130 in which a virtual private network (VPN) is configured.

A multiple monitor 170 may be connected to the cloud server 140. An O & M manager 181 may monitor an operation status of each wind turbine 111 and 121 through the multiple monitor 160 and project/product managers 183 and technical experts 185 may manage the operation of the wind turbine 111 and 121 using the personal computers 150 and 160.

That is, the wind farm supervision monitoring system according to the embodiment of the present disclosure acquires data from the wind turbine 111 and 121, the Met. Mast 112 and 122, and the O & M engineer 187 and stores the acquired data in the site server 113 and 123 and the cloud server 140. The O & M engineer 187, the O & M manager 181, the project/product manager 183, and the technical expert 185 share a turbine operation status, an operation and maintenance plan and record, customer's requirements, or the like on a web and perform a cooperative work to solve an abnormality status of the wind turbine 111 and 121 and establish the operation and maintenance plan.

Figure 2:
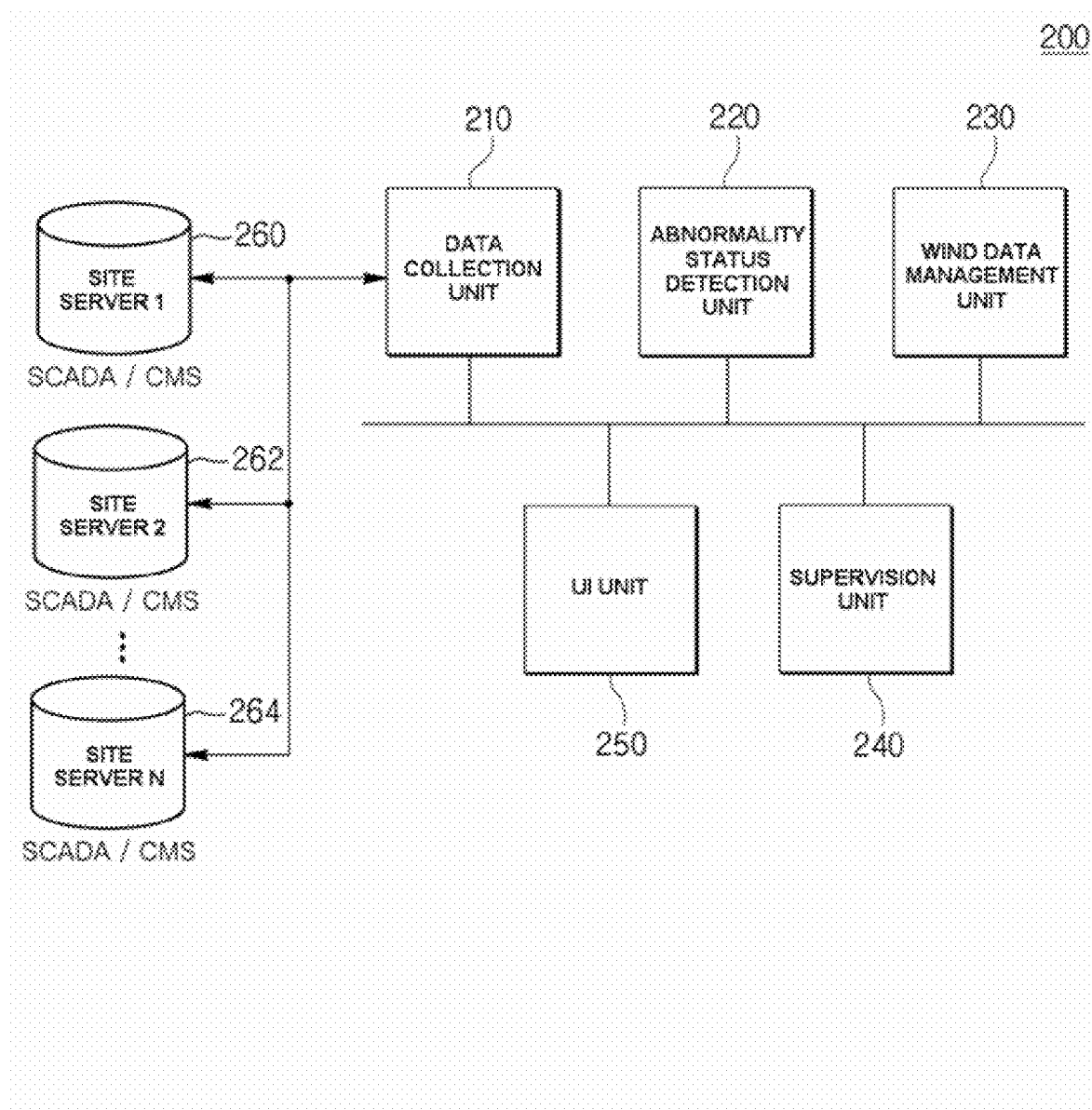
FIG. 2 is a diagram schematically illustrating the whole configuration of the wind farm supervision monitoring system according to an embodiment of the present disclosure.

FIG. 2 is a diagram schematically illustrating the whole configuration of the wind farm supervision monitoring system according to an embodiment of the present disclosure.

Referring to FIG. 2, a wind farm supervision monitoring system 200 according to an embodiment of the present disclosure has a computer, processor, circuitry, or information processing apparatus which includes a data collection unit 210, an abnormality status detection unit 220, a wind data management unit 230, a supervision unit 240, and a user interface (UI) unit 250.

The data collection unit 210 collects data about status monitoring of each wind turbine from at least one site server 260 to 264. Here, the data collection unit 210 may set special conditions, for example, conditions on how fast a wind speed is, which direction a wind direction is, whether an outside situation corresponds to a specific condition, or the like and may collect data only when the wind turbine corresponds to the setting.

The abnormality status detection unit 220 detects the abnormality status of each wind turbine based on the collected data about the status monitoring of each wind turbine and issues an alarm.

The wind data management unit 230 may early detect a fault of each wind turbine or monitor performance of each wind turbine, based on the data about the status monitoring of each wind turbine provided from at least one site server 260 to 264 or the data about the abnormality status of each wind turbine detected by the abnormality status detection unit 220.

The supervision unit 240 may manage a turbine operation status and operation and maintenance of each wind turbine and provide information for establishing an operation and maintenance plan for the detected abnormality status of the wind turbine.

Figure 3:
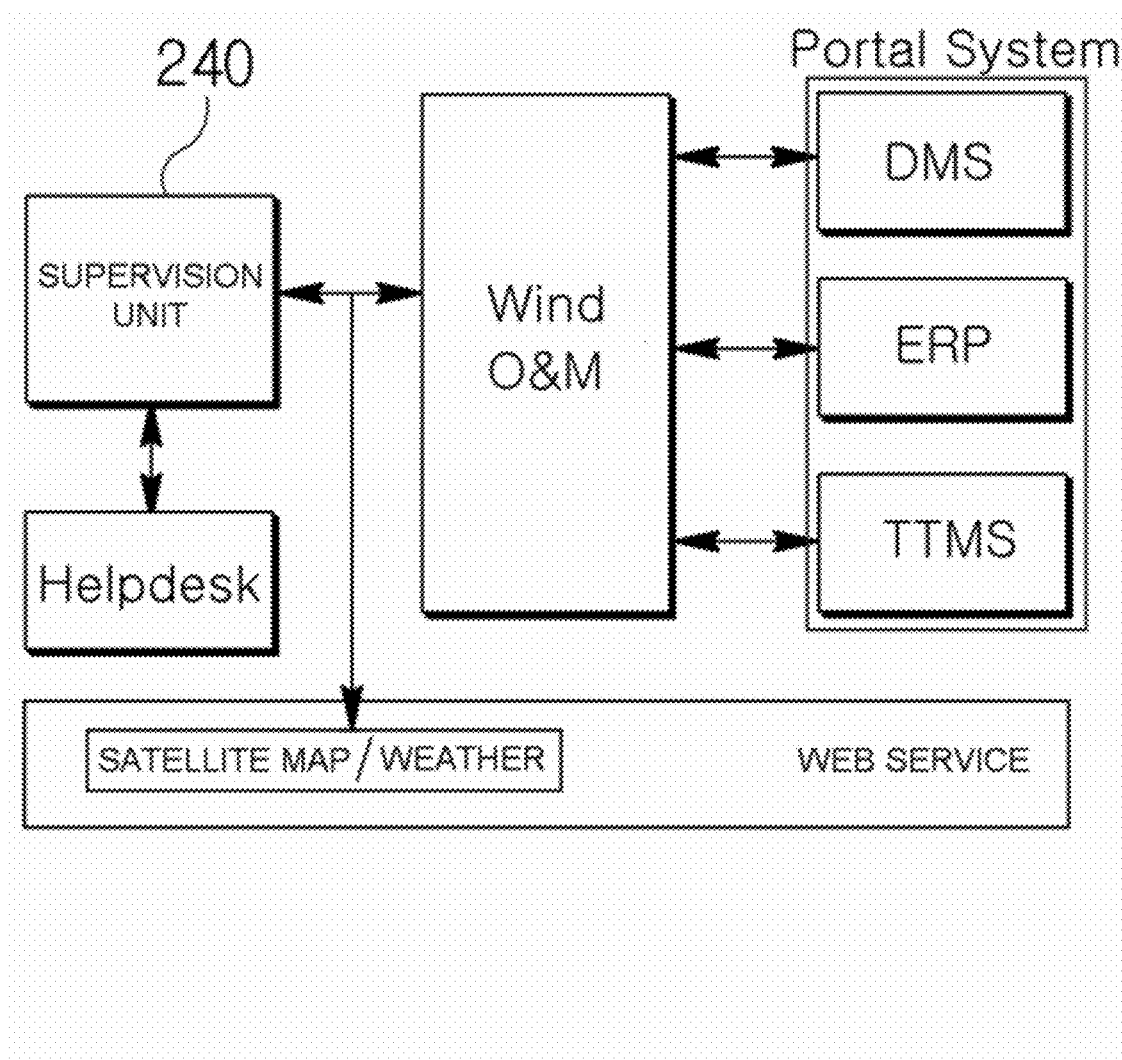
FIG. 3 is a diagram illustrating an example in which wind O & M management according to an embodiment of the present disclosure is performed by being linked with a portal system.

Further, for the wind operation and maintenance (O & M), as illustrated in FIG. 3, the supervision control unit 240 may be linked with a portal system that includes a document management system (DMS) 310, an enterprise resource planning (ERP) 320 system, and a tool total management system (TTMS) 330 to perform components management, a work plan and record, a cooperation of an on-site work problem, and tool management.

FIG. 3 is a diagram illustrating an example in which wind O & M management according to an embodiment of the present disclosure is performed by being linked with a portal system. As illustrated in FIG. 3, the supervision unit 240 may provide a satellite map or weather forecast information through a web service. Further, in FIG. 3, the supervision unit 240 may mainly provide a customer's question and answer function through a helpdesk menu 340.

Figure 4:
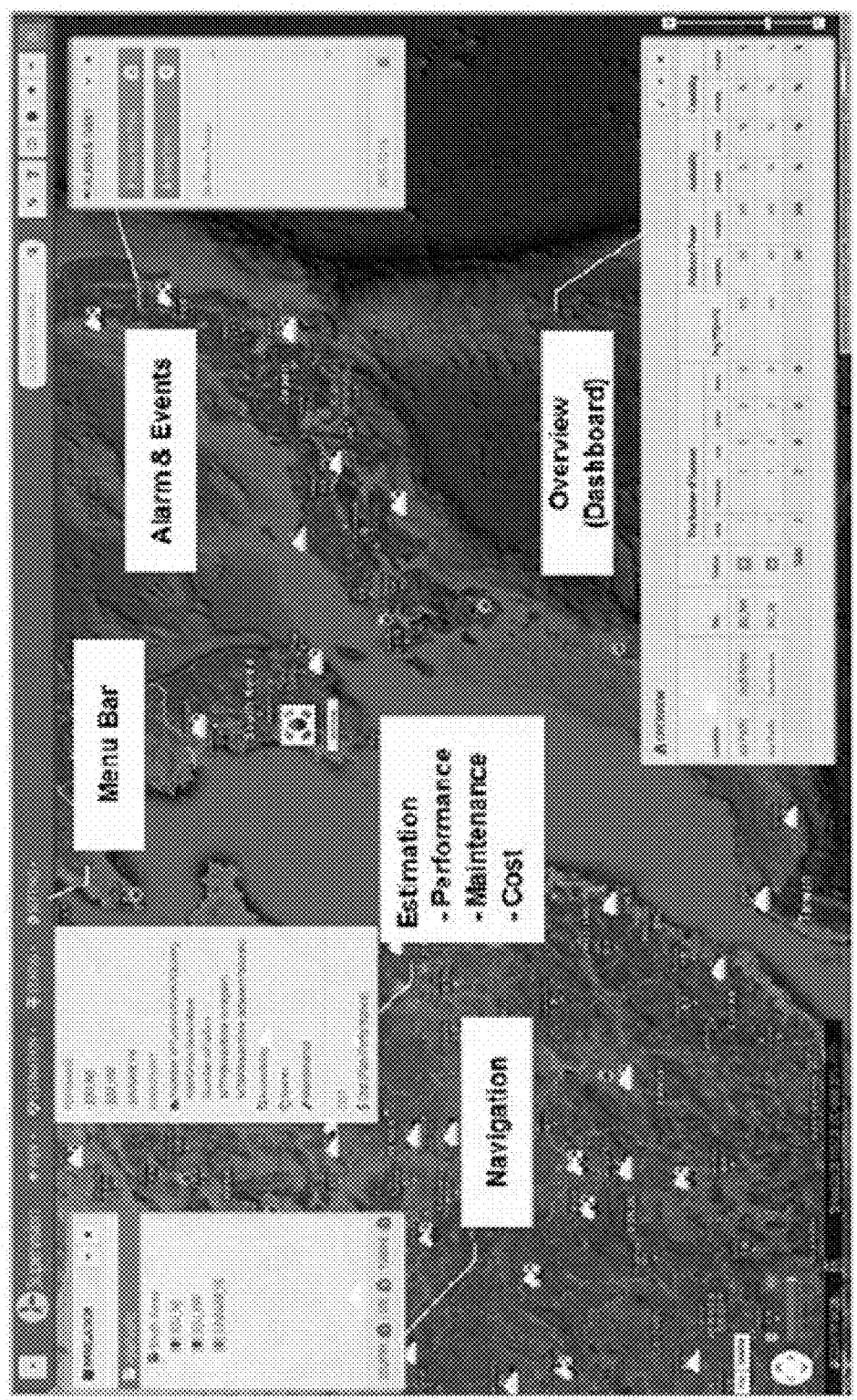
FIG. 4 is a diagram illustrating an example in which locations of each site are visually displayed on a map using a user interface unit according to an embodiment of the present disclosure.

As illustrated in FIG. 4, the user interface unit 250 visually displays locations of each site for at least one wind farm and may display a live turbine operation status, an operating ratio, and utilization of each wind turbine by a dashboard menu 410. FIG. 4 is a diagram illustrating an example in which locations of each site are visually displayed on a map using a user interface unit according to an embodiment of the present disclosure. In FIG. 4, the user interface unit 250 may display the information on each wind farm by a navigation menu 420. In FIG. 4, the user interface unit 250 may display a turbine error of each wind turbine, an early alarm, a work history, and a helpdesk function by an alarm & event menu.

Further, the user interface unit 250 may display a kind of information exposed as a default on the interface screen of FIG. 4 and display the information exposed as the default on a plurality of independent windows.

Figure 5:
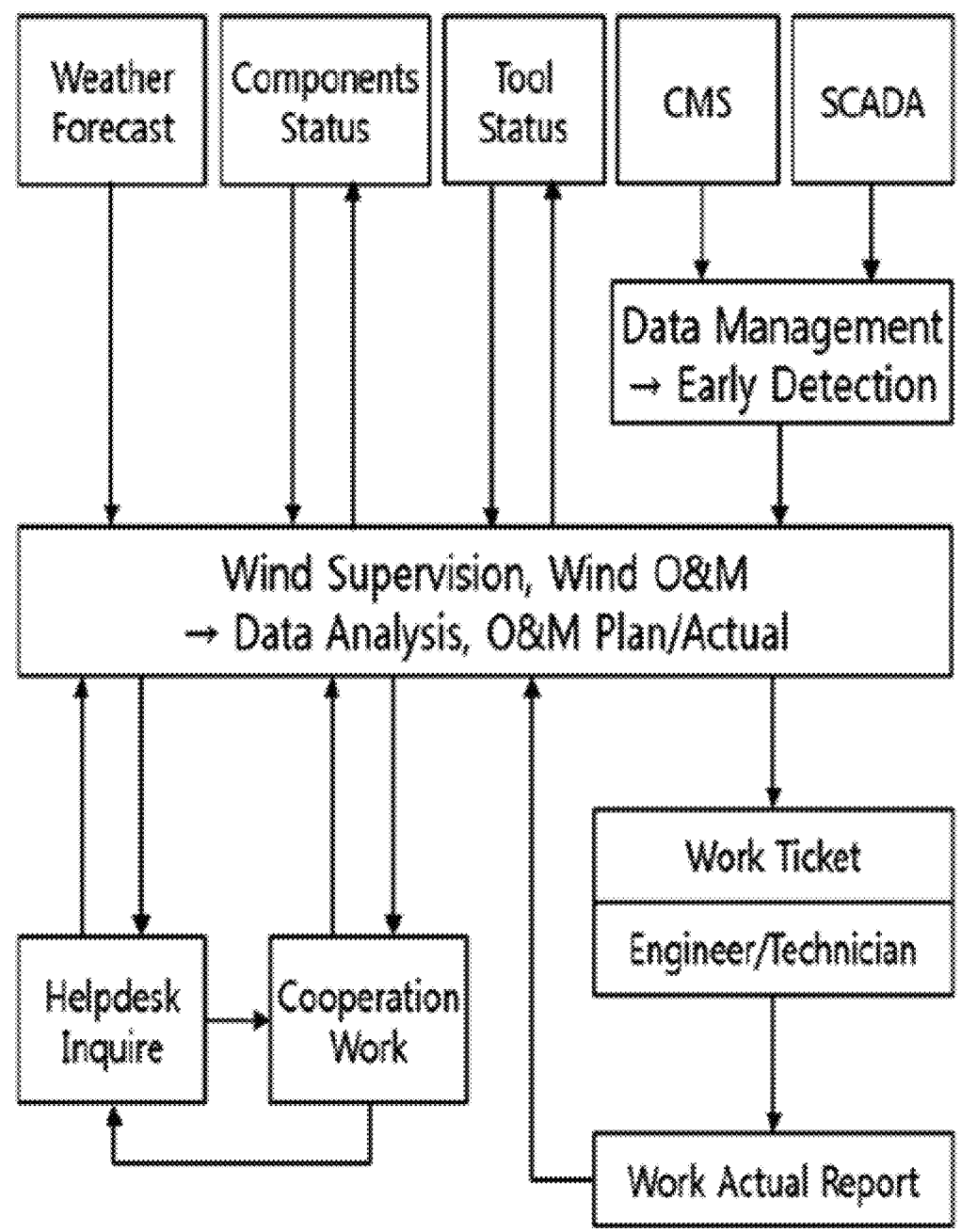
FIG. 5 is a diagram illustrating wind supervision and operation and maintenance (O & M) according to an embodiment of the present disclosure.

Meanwhile, for the wind supervision and the wind operation and maintenance, as illustrated in FIG. 5, the supervision unit 240 collects the SCADA data and the CMS data provided from at least one site server 260 to 264 to early detect the abnormality status using data management. FIG. 5 is a diagram illustrating wind supervision and operation and maintenance (O & M) according to an embodiment of the present disclosure. In FIG. 5, the supervision unit 240 may collect information on a weather forecast, a components status, and a tool status to establish O & M plan/actual. Further, the supervision unit 240 may automatically issue a work ticket suggesting a direction in which a worker may be performed depending on the established O & M plan/actual to an engineer and/or technician and receive a registration of a work record depending on the work ticket. In addition, the supervision unit 240 may perform a customer inquire of a helpdesk and a cooperative work for an answer.

Further, for the wind O & M, the supervision unit 240 performs functions about component/spare management, work plan/actual, cooperative work, manual/guarantee status management, tool/equipment management, and helpdesk reply of each wind turbine.

Further, for the O & M plan, the supervision unit 240 may determine one of a run to failure that performs maintenance after the operation until a major part breaks, periodic maintenance that periodically performs maintenance for a predetermined period, and status based maintenance that acquires a facility status based on a facility diagnosis technology or a status monitoring technology to early detect a fault and tracks the progress to predict the next progress to thereby perform the operation and maintenance at a specific time, thereby establishing the operation and maintenance plan.

Figure 6:
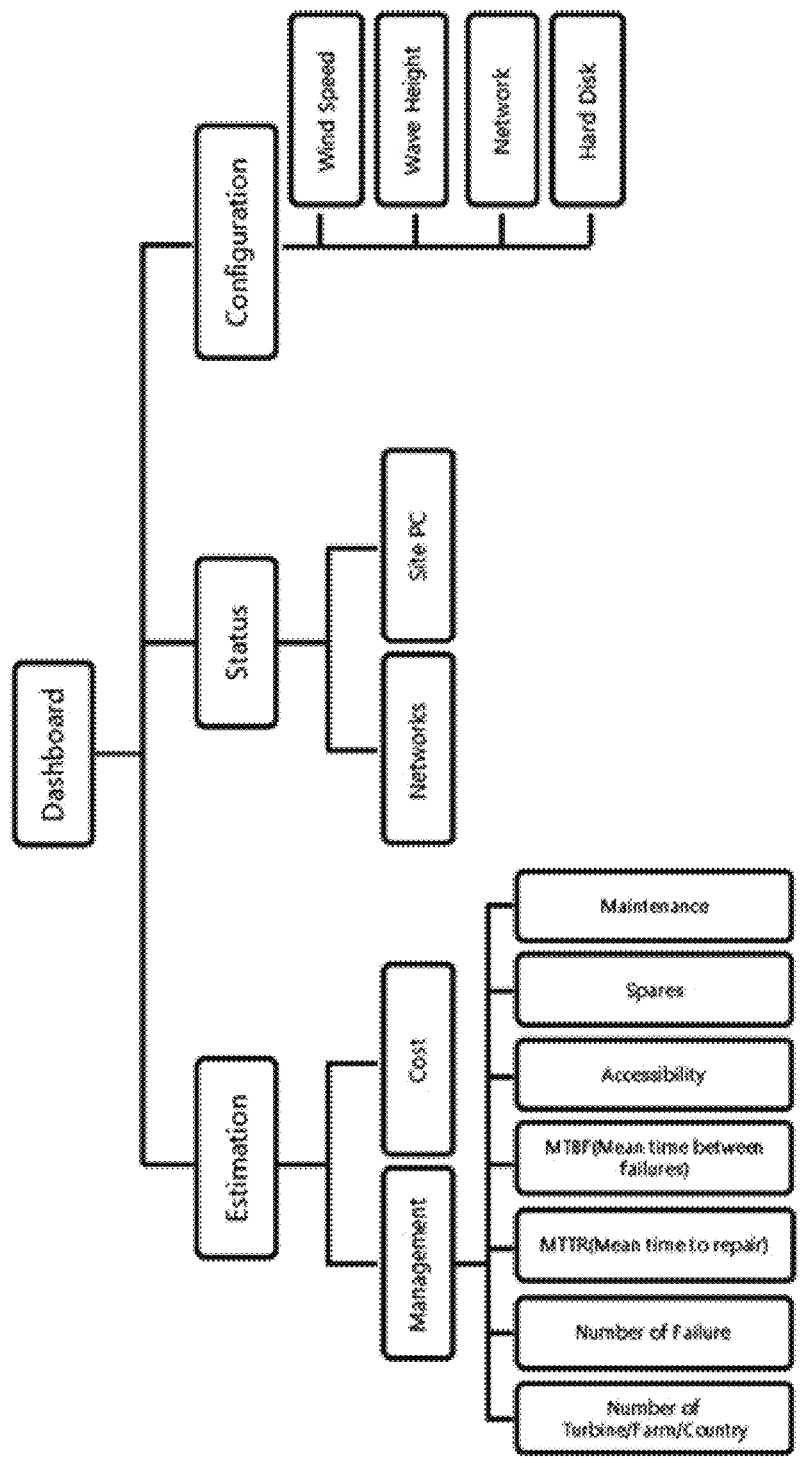
FIG. 6 is a diagram illustrating a functional configuration of a dashboard menu displayed on a user interface screen according to an embodiment of the present disclosure.

Meanwhile, the dashboard menu illustrated in FIG. 4 provides a composite dashboard for the site and the turbine and as illustrated in FIG. 6, may include an estimation function, a status function, and a configuration function. FIG. 6 is a diagram illustrating a functional configuration of a dashboard menu displayed on a user interface screen according to an embodiment of the present disclosure. In FIG. 6, the estimation function includes a management function and a cost function, the status function includes a network function and a site PC function, and the configuration function includes a wind speed, a wave height, a network, and a hard disk, such that priority and a threshold value of equipment may be set.

Further, the dashboard menu may provide a country, a site, and information on each turbine depending on the navigation and alarm, an overview panel, and a zoom level of a map.

Further, in the dashboard menu of FIG. 6, the management function may include a status about the number of turbines, the number of wind farms, the number of countries, the number of failures, mean time to repair (MTTR), and mean time between failure (MTBF), accessibility to each site, spares by site, and periodic maintenance for each turbine.

Figure 7:
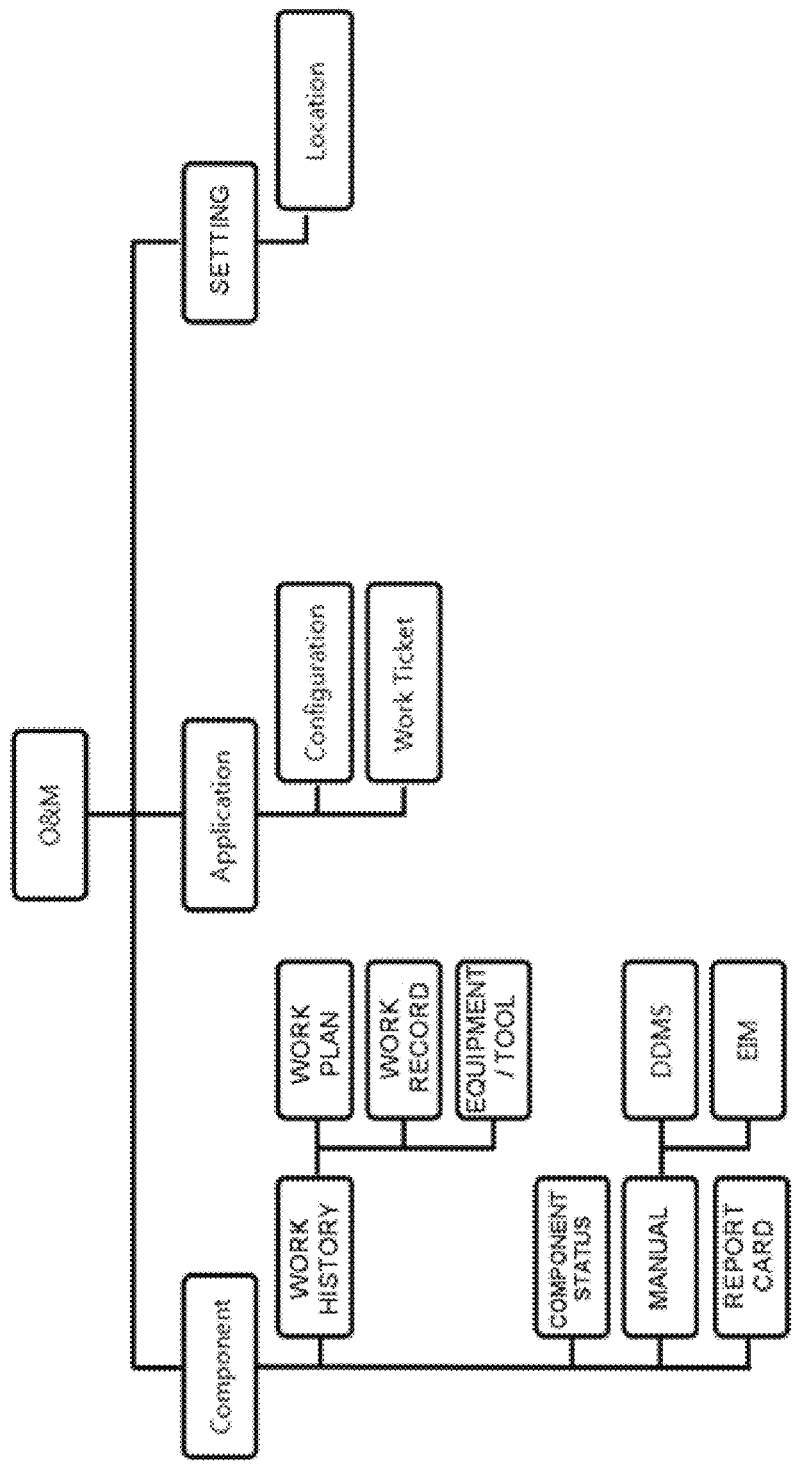
FIG. 7 is a diagram illustrating a detailed menu example of an operation and maintenance menu according to an embodiment of the present disclosure.

Meanwhile, for the operation and maintenance, as illustrated in FIG. 7, the supervision unit 240 may perform a control by a component management menu, a mobile application menu, and a configuration menu. FIG. 7 is a diagram illustrating a detailed menu example of an operation & maintenance menu according to an embodiment of the present disclosure.

In FIG. 7, for the component management menu, the supervision unit 240 may perform a function of inquiring the work history for each component, the components status, a manual, a report card, and a term of guarantee and confirming the location of components.

Further, for the mobile application menu, the supervision unit 240 may provide the functions of the supervision, the O & M, and the helpdesk so that a mobile terminal may confirm the operation status of the wind turbine and for the configuration menu, the supervision unit 240 may provide a location function of adding, modifying, and deleting information on an area, a country, a site, and a turbine.

Here, for plan maintenance, corrective maintenance, and prediction maintenance, the work history may include a work plan function of inquiring and registering a work plan, a work record function of inquiring a work record input to the issued work ticket, and an equipment tool function of inquiring equipment and tool used for work.

Further, the components status may inquire an inventory status of a spare part for each site and request a purchase and delivery for components, the manual may include a DDMS function of registering and inquiring a distributed database management system (DDMS) document and an EIM function of registering and inquiring an enterprise information management (EIM) document, and the report card and the term of guarantee may include a function of inquiring a report card and a term of guarantee of parts.

Further, the mobile application menu may confirm the operation status of the wind turbine using a mobile terminal through the monitoring function and allow an in-house staff or a worker of a cooperative firm to register a work record using a mobile terminal when the work ticket is issued through the O & M function and register questions or issue matters of the turbine and write history management using a mobile terminal through the helpdesk function.

Figure 8:
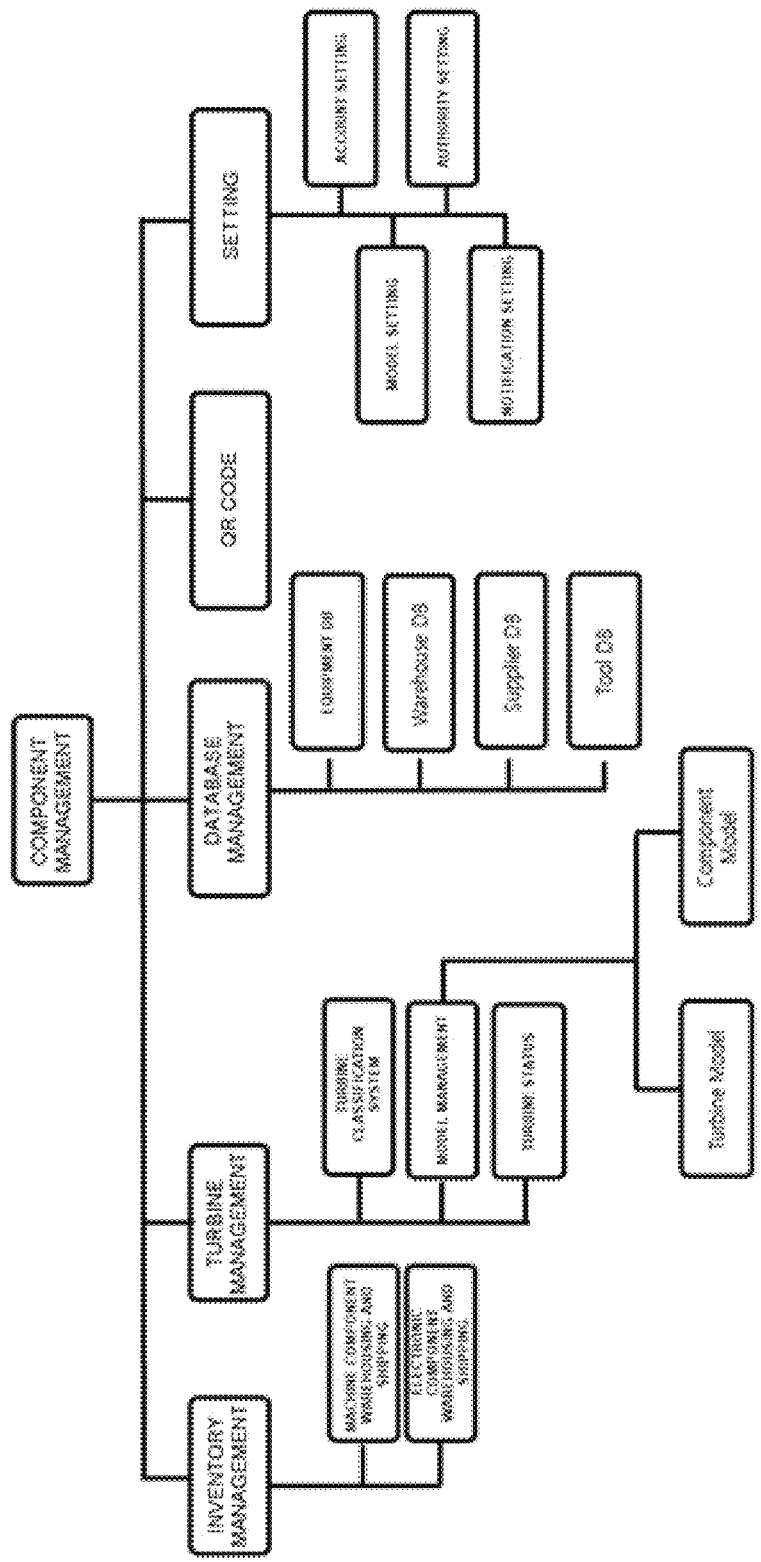
FIG. 8 is a diagram illustrating a function of managing parts according to an embodiment of the present disclosure.

Meanwhile, the component management menu is to manage new warehousing and shipping, a turbine model, and a components status and as illustrated in FIG. 8, may include inventory management, turbine management, database (DB) management, QR code management, and setting management. FIG. 8 is a diagram illustrating a function of managing parts according to an embodiment of the present disclosure.

In FIG. 8, the inventory management may include a machine component warehousing and shipping function of inquiring a warehousing and shipping history of a machine component and an electronic component warehousing and shipping function of inquiring a warehousing and shipping history of an electronic component.

Further, the turbine management may perform a turbine classification system function of inquiring a turbine classification system based on the model management menu, a turbine model function of adding, modifying and inquiring the turbine model, and a component model function of adding, modifying, and inquiring a component model and may inquire the turbine status based on a turbine status menu.

Further, the DB management may add, modify, and inquire equipment information using the equipment DB menu, add, modify, and inquire component warehouse information using a warehouse DB menu, add, modify, and inquire supplier information using a supplier DB menu, or add, modify, and inquire tool information using a tool DB menu.

Further, the setting management may include a model setting menu for managing model setting, a notification setting menu for setting items to be notified through e-mail and SMS, an account setting menu for managing an account of a component management user, and an authority setting menu for setting authority for the component management user.

Further, as illustrated in FIG. 8, the component management menu may include a QR code menu for managing QR code information input from a cooperative firm and providing a user interface (UI) that may issue the QR code.

Further, the mobile application menu may recognize the shipping information when the components are shipped from a cooperative firm and inputs the recognized shipping information to a database through a mobile terminal and may connect the previously input component information to the turbine of the corresponding site when the turbine is assembled.

Figure 9:
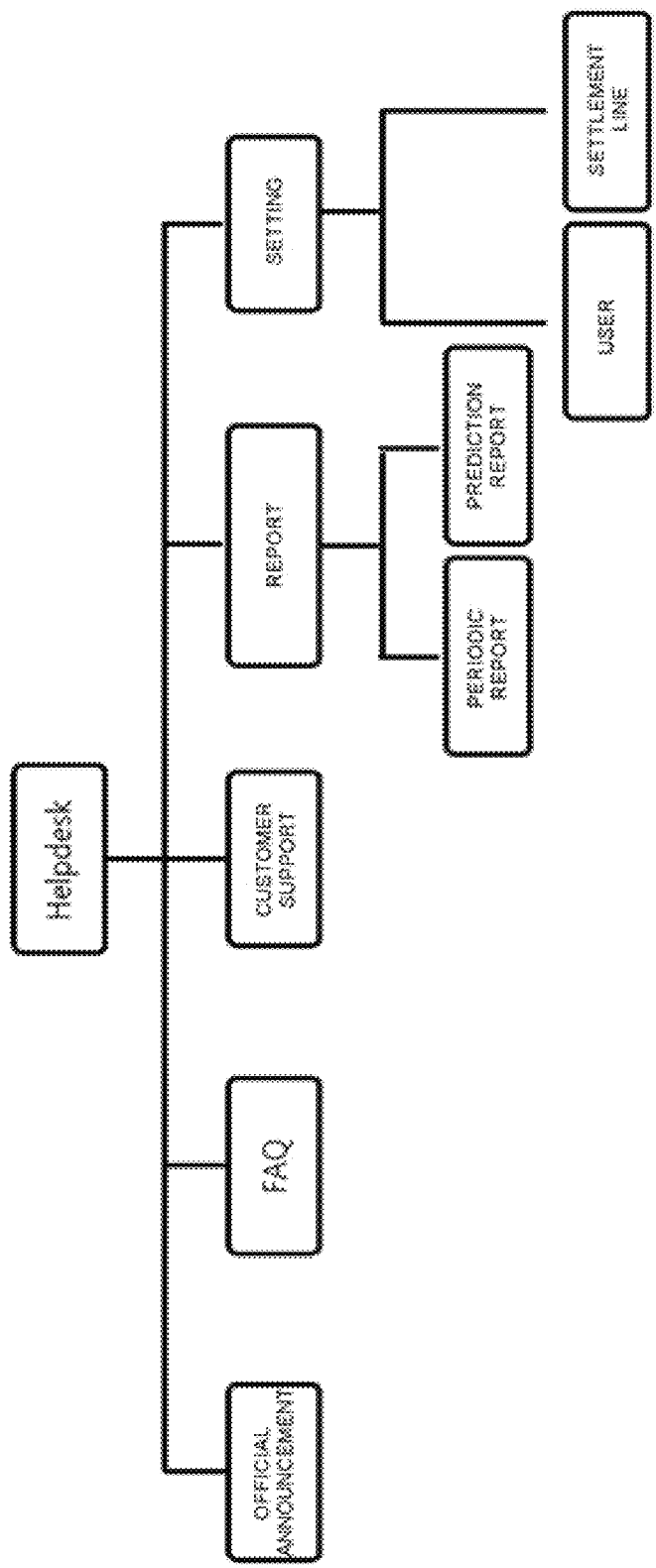
FIG. 9 is a diagram illustrating a configuration of a helpdesk function under the wind supervision according to the embodiment of the present disclosure.

Meanwhile, the helpdesk function of FIG. 3 is to display latest writings of each bulletin board on a home screen in a card and list form and perform a unified search thereon and as illustrated in FIG. 9, may include an official announcement menu, a frequently asked questions (FAQ) menu, a customer support menu, a report menu, and a setting menu. FIG. 9 is a diagram illustrating a configuration of a helpdesk function under the wind supervision according to the embodiment of the present disclosure.

In FIG. 9, the official announcement menu may allow a manager to register the known writing and may inquire or confirm the official announcement posted by the manager. The frequently asked questions menu may inquire or confirm questions posted by a manager and the customer support menu may post or confirm customer related contents.

Further, the report menu may include a periodic report function of registering, modifying, inquiring a periodic report and a prediction report function of registering, modifying, and inquiring a prediction report and the setting menu may include a user setting function of adding, modifying, and inquiring a helpdesk user or setting authority by user.

Figure 10:
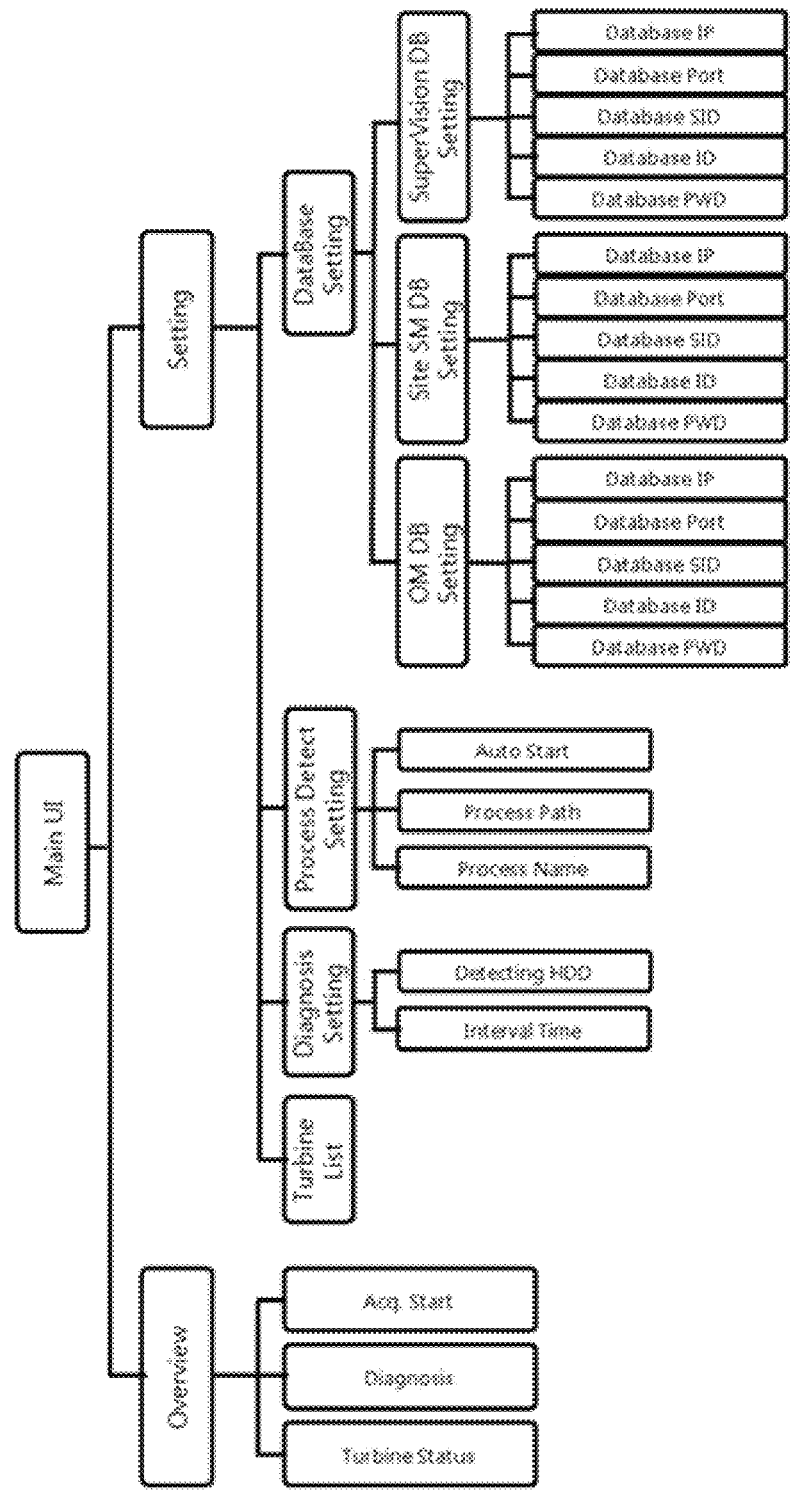
FIG. 10 is a diagram illustrating an example of a user interface menu for automatic diagnosis of a wind turbine according to an embodiment of the present disclosure.

Meanwhile, as illustrated in FIG. 10, the user interface unit 250 may include an overview menu and a setting menu for an auto diagnosis function. FIG. 10 is a diagram illustrating an example of a user interface menu for automatic diagnosis of a wind turbine according to an embodiment of the present disclosure.

In FIG. 10, the overview menu may represent a collection status of the SCADA and CMS data of registered turbines using a turbine status function, represent a live system status using a diagnosis function, or start data-linking with a system monitoring and supervision unit using an acquisition start function.

In FIG. 10, the setting menu may display information of currently registered turbines using a turbine list function.

Further, the setting menu may set an interval time at which a system monitoring item data is transmitted to the supervision unit using a diagnosis setting function.

Further, the setting menu may select and change a hard disk (HDD) of which the consumed amount needs to be checked.

Further, the setting menu may set a process name that monitors a process operation status using a process detect setting function, set a process path for forcibly and automatically restarting a process, or set an auto start when an operation is not performed during the process monitoring.

Further, the setting menu may set a database access IP address, a database access port number, a database access SID or data source, a database access ID, a database access password using the database setting function.

Meanwhile, a wind data management unit 230 of FIG. 2 may manage a live data menu, a recorded data menu, an analysis menu, a statistics menu, and a performance menu.

Here, the live data menu may display a live data of a turbine and the recorded data menu may display information corresponding to an error photo and an error trace and may display a day counter data, a day counter status data, a total counter data, a total counter status data, and a status message for a PLC status change.

Further, the analysis menu may perform a normal analysis using a trend analysis function, analyze raw data using a time-FFT analysis function, or analyze smart shield data using an early detect function.

Further, the statistics menu may analyze an occurrence frequency of turbines within a wind farm for a specific tag using an accumulated chart function or analyze a change in data in response to a wind direction and locations of nacelle using a wind chart function.

Further, the statistics menu may display a heat map chart for confirming weekly average data for a turbine within a wind farm using a turbine heat map chart function or analyze each error occurrence frequency of a turbine using an error chart function.

Further, the performance menu may display data of generation in response to a wind speed of a turbine using a power curve function or display data for vibration of a turbine using a vibration function.

Meanwhile, a data collection unit 210 of FIG. 2 may include an overview menu and a setting menu.

The overview menu may display a turbine status currently connected to a PLC using a turbine status function or start a connection to the PLC and an acquisition of data based on the set information using an acquisition start function.

Further, the setting menu may display or modify a turbine list including modbus connection information of the PLC using a turbine information function.

Further, the setting menu may add a turbine or delete (delete turbine) connection information to a turbine selected from the current list.

Further, the setting menu may set (listen IP) an IP of a TCP listener receiving a command for collecting raw data from a data manager using a TCP setting function or set (listen port) an IP port of the TCP listener receiving a command for collecting the raw data from the data manager.

Figure 11:
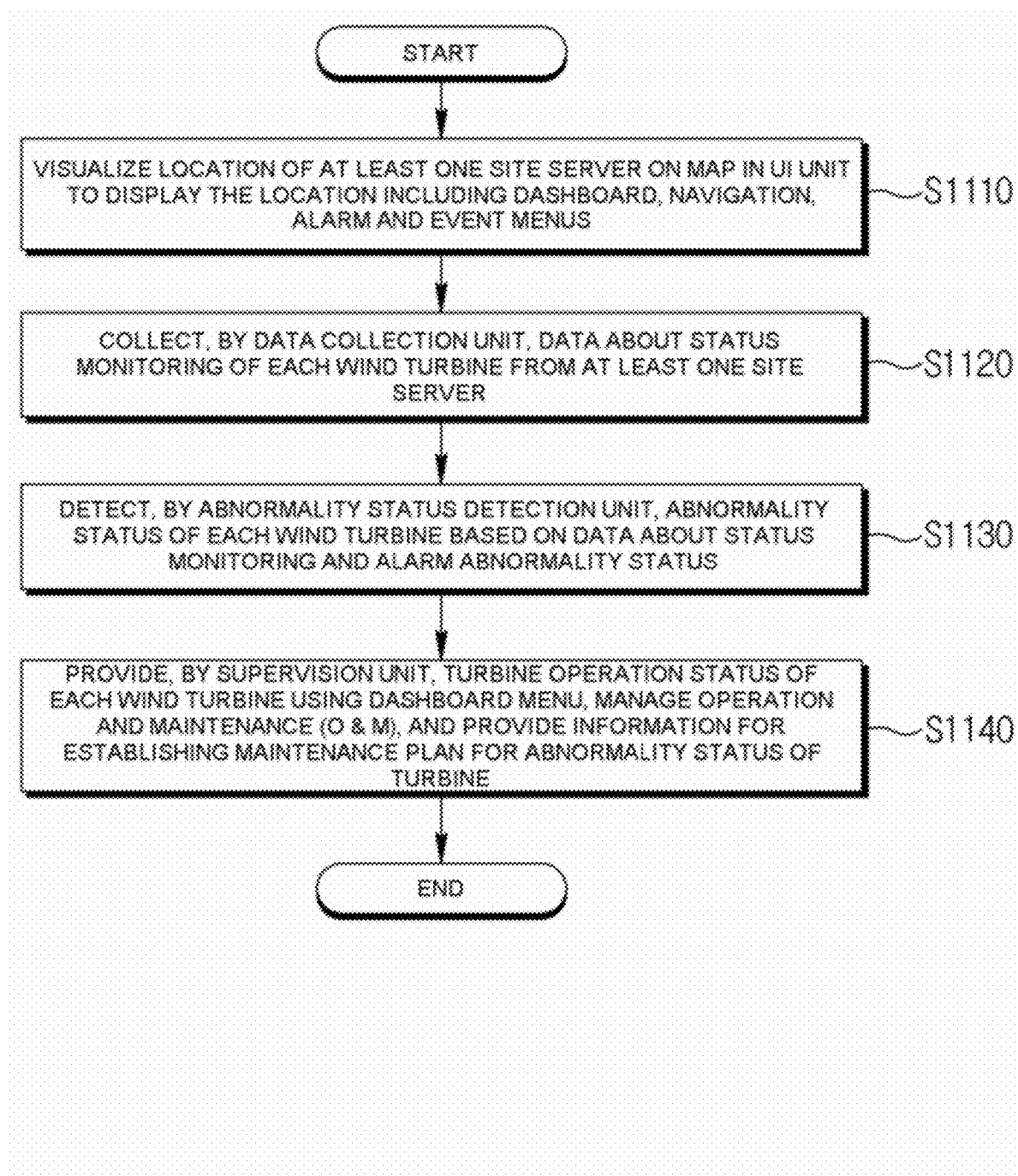
FIG. 11 is a diagram illustrating an operation flow chart for describing a wind farm supervision monitoring method according to an embodiment of the present disclosure.

FIG. 11 is a diagram illustrating an operation flow chart for describing a wind farm supervision monitoring method according to an embodiment of the present disclosure.

Referring to FIG. 11, a wind farm supervision monitoring system 200 according to an embodiment of the present disclosure visualizes locations of at least one server 260 to 264 in the UI unit 250 on a map and displays them including a dashboard menu, a navigation menu, and an alarm & event menu (S1110).

Next, the data collection unit 210 collects data on the status monitoring of each wind turbine from at least one site server (S1120).

Next, the abnormality status detection unit 220 detects an abnormality status of each wind turbine based on the data about the status monitoring of each wind turbine and issues an alarm (S1130).

Next, the supervision unit 240 may manage a turbine operation status and operation and maintenance of each wind turbine using the dashboard menu and provide information for establishing the operation and maintenance plan for the detected abnormality status of the wind turbine (S1140).

In this case, the supervision unit 240 may collect the early alarm, the weather forecast, and the component and tool status information using the SCADA data and the CMS data provided from at least one site server to establish the operation and maintenance plan, automatically issue the work ticket suggesting the direction in which the worker may progress based on the established maintenance plan, receive the registration of the work record depending on the work ticket, and perform the cooperative work for the customer request and answer of the helpdesk.

Further, for the operation and maintenance, the supervision unit 240 may set a default period for a plurality of sites, readjust the set period depending on the location and availability of required components and a weather condition and select an operation and maintenance work that mainly happens at each site.

Further, for the operation and maintenance, the supervision unit 240 may search for the previous information at the time of a future plan based on a plan, a practice, and history management for maintenance personnel and store a moving path of manpower by site as information, thereby performing the management.

Further, for the operation and maintenance, the supervision unit 240 may search for the previous information at the time of a future plan based on a plan, a practice, and history management for components by each site, stores a kind and the number of components required by work that frequently happens, and store a moving path of scattered components by site as information, thereby performing the management.

Further, for the operation and maintenance, the supervision unit 240 may provide an interface for issuing the work ticket provided through the mobile terminal or an interface for writing the work ticket issued through the mobile terminal.

Further, for the operation and maintenance, the supervision unit 240 may visually provide the term of guarantee of each component or part to easily identify the term of guarantee of each component or part.

Further, for the O & M plan, the supervision unit 240 may determine one of the run to failure that performs maintenance after the operation until the major part breaks, the periodic maintenance that periodically performs maintenance for a predetermined period, and the status based maintenance that acquires a facility status to early detect a fault and tracks the progress and then predicts the progress to perform the operation and maintenance at a specific time, thereby establishing the operation and maintenance plan.

Further, as illustrated in FIG. 6, the dashboard menu includes the estimation function, the status function, and the configuration function, in which the estimation function may include a management function and a cost function and the status function may include a network function and repository function.

Further, the configuration function may set the wind speed, the wave height, and the priority and the threshold value of the equipment including the network and the hard disk.

Further, the management function may include a status about the number of turbines, the number of wind farms, the number of countries, the number of failures, the mean time to repair (MTTR), and the mean time between failure (MTBF), the accessibility to each site, the spares by site, and the periodic maintenance for each turbine.

Meanwhile, for the operation and maintenance, as illustrated in FIG. 7, the supervision unit 240 may perform a control by a component management menu, a mobile application menu, and a configuration menu.

For the component management menu, the supervision unit 240 may perform a function of inquiring the work history for each component, the components status, the manual, the report card, and the term of guarantee and confirming the locations of components.

Further, for the mobile application menu, the supervision unit 240 may provide the supervision, operation and maintenance (O & M), and helpdesk function so that the mobile terminal may confirm the operation status of the wind turbine.

Further, for the configuration menu, the supervision unit 240 may provide a location function of adding, modifying, and deleting information on an area, a country, a site, and a turbine.

Further, for the plan maintenance, the run to failure, and the prediction maintenance, the work history for each part may include the work plan function of inquiring and registering the work plan, the work record function of inquiring the work record input to the issued work ticket, and the equipment tool function of inquiring the equipment and tool used for work.

Further, the components status may inquire the inventory status of spare part by site and request the purchase and the delivery of the components. The manual may include the DDMS function of registering and inquiring the DDMS document and the EIM function of registering and inquiring the EIM document. The report card and the term of guarantee may include a function of inquiring a report card and a term of guarantee of part.

Further, the mobile application menu may allow a mobile terminal to confirm the operation status of the wind turbine using the monitoring function. Further, an in-house staff or a worker of a cooperative firm may register a work record using a mobile terminal when the work ticket is issued through the O & M function. The helpdesk function may use the mobile terminal to register the questions or issue matters of the turbine and write the history management.

Further, the component management menu is to manage new warehousing and shipping, a turbine model, and a components status and as illustrated in FIG. 8, may include the inventory management, the turbine management, the database (DB) management, and the setting management.

Further, the inventory management may include the warehousing and shipping function of a machine component that inquires the warehousing and shipping history of the machine component and the electronic component warehousing and shipping function that inquires the warehousing and shipping history of the electronic component.

Further, the turbine management may perform the turbine classification system function of inquiring the turbine classification system based on the model management menu, the turbine model function of adding, modifying and inquiring the turbine model, and the component model function of adding, modifying, and inquiring the component model and may inquire the turbine status based on the turbine status menu.

Further, the DB management may add, modify, and inquire the equipment information using the equipment DB menu, add, modify, and inquire the component warehouse information using the warehouse DB menu, add, modify, and inquire the supplier information using the supplier DB menu, or add, modify, and inquire the tool information using the tool DB menu.

Further, the setting management may include the model setting menu for managing model setting, the notification setting menu for setting items to be notified through e-mail and SMS, the account setting menu for managing the account of the component management user, and/or the authority setting menu for setting authority for the component management user.

Further, the component management menu may include the QR code menu for managing the QR code information input from a cooperative firm and providing the user interface (UI) that may issue the QR code.

Further, the mobile application menu may recognize the shipping information when the components are shipped from a cooperative firm and inputs the recognized shipping information to a database through a mobile terminal and may connect the previously input component information to the turbine of the corresponding site when the turbine is assembled.

Further, the helpdesk function is to display latest writings of each bulletin board on the home screen in a card and list form and perform a unified search thereon and as illustrated in FIG. 9, may include the official announcement menu, the frequently asked questions (FAQ) menu, the customer support menu, the report menu, and the setting menu.

Further, the official announcement menu may allow a manager to register the known writing and inquire or confirm the known matters posted by the manager and the frequently asked questions menu may inquire or confirm the questions posted by the manager.

Further, the customer support menu may post or confirm a customer related content and the report menu may include a periodic report function of registering, modifying, and inquiring a periodic report and a prediction report function of registering, modifying, and inquiring a prediction report.

Further, the setting menu may include a user setting function of adding, modifying, and inquiring a helpdesk user or setting authority by user.

Meanwhile, as illustrated in FIG. 10, the dashboard menu for the automatic diagnosis of the wind turbine may include the overview menu and the setting menu.

Further, the overview menu may represent the collection status of the SCADA and CMS data of the registered turbines using the turbine status function, represent the live system status using the diagnosis function, or start datalinking with the system monitoring and supervision unit using the acquisition start function.

Further, the setting menu may display the information of the turbines currently registered through the turbine list function, set the interval time at which the system monitoring item data are transmitted to the supervision unit through the diagnosis setting function, or detecting an HDD to select and change the hard disk (HDD) of which the consumed amount needs to be checked.

Further, the setting menu may set the process name that monitors the process operation status using the process detect setting function, set the process path for forcibly and automatically restarting the process, or set the auto start when the operation is not performed during the process monitoring.

Further, the setting menu may set the database access IP address, the database access port number, the database access SID or data source, the database access ID, the database access password using the database setting function.

Further, the supervision unit 240 may provide information of a power curve representing the turbine performance, an SCADA, CMS trend confirming a data history, an accumulated histogram for comparing a normal data between the turbines with an error data, an error occurred number, abnormality detection for early alarm, or the like as illustrated in FIGS. 12A to 12E based on the data management function using the data collected by the data collection unit 210 from each site server 260 to 264. FIGS. 12A to 12E are diagrams illustrating an example of information provided by a data management function according to an embodiment of the present disclosure.

Further, for the wind operation and maintenance (O & M), the supervision unit 240 may provide information of the turbine work plan/record, the component status, the operation and maintenance manual, the term of guarantee, or the like.

Meanwhile, the supervision unit 240 may be linked with a mobile device carried by the O & M manager or the interested party that manages each wind farm to provide an operation status or a work history of each wind turbine within a wind farm, component warehousing, and a bulletin board message registration status on a screen of the mobile device as illustrated in FIGS. 13A to 13D. FIGS. 13A to 13D are diagrams illustrating an example of providing a turbine operation status within a wind farm to a mobile device, according to an embodiment of the present disclosure. As illustrated in FIGS. 13A to 13D, the supervision unit 240 may provide the operation status of the wind turbine within the wind farm, the work history of the O & M, the component warehousing status, information on customer bulletin board message registration and confirmation of a help desk to the mobile device.

Therefore, the manager, the interested party, or the like of the wind generation may perform works associated with the operation and maintenance of the turbine through the mobile device carried by him/her without going to a workplace or a control office.

As described above, according to the embodiment of the present disclosure, it is possible to realize the wind farm supervision monitoring system capable of minimizing the influence of the accessibility according to a weather condition, the supply and demand of parts and equipment, the number of workers, or the like when the operation and maintenance (O & M) for managing at least one wind farm is performed, acquiring the data from the plurality of wind farms based on the management control data acquisition (SCADA) and the status monitoring system (CMS) to early detect the failure of parts and prevent the critical accident, sharing the turbine operation status, the operation and maintenance plan and record, the customer's requirements, or the like on a web and performing the cooperative work to manage the alarms and events of several turbines and provide the information for establishing the operation and maintenance.

According to the embodiments of the present disclosure, it is possible to collect the status data of the wind turbine in the wind farm by the automatic diagnosis.

Further, it is possible to set the range appropriate for the special situation within the wind farm and collect only the data corresponding to the setting.

Further, it is possible to monitor the process of the server installed within the wind farm in real time to reduce the load of the CPU while managing the plurality of wind farms.

Further, it is possible to display various data such as the output of the wind turbines in each wind farm, the vibration, the error rate, the wind direction, and the wind speed that are managed by the supervision system.

Further, the manager, the interested party, or the like may confirm the official announcement, the frequently asked questions (FAQ), or the like, for each wind farm based on the online wind helpdesk.

Further, the manager, the interested party, or the like may use his/her own smart terminal to receive the support of the helpdesk status or inquire the helpdesk status.

Further, the interested part, or the like may search for the serial number or confirm the identity of the connected user and then inquire the question contents on the wind turbines within each wind farm.

Further, the manger, the interested party, or the like may register, modify, or inquire the periodic reports or the forecast reports for the status of the wind turbines within each wind farm and automatically create the forecast reports based on the input status data.

Further, it is possible to select and inquire the period in which the equipment may be operated and calculate the time in which the equipment may be operated based on the data collected from the supervision monitoring server.

Further, it is possible to automatically issue the work ticket for the operation and maintenance of the wind turbine and provide the direction for the worker to most efficiently perform the operation and maintenance based on the work ticket.

Further, it is possible to perform the post-maintenance after the breakdown, the operation and maintenance for each part every set period, the operation and maintenance according to the past, current, and future by predicting the operation and maintenance date based on the collected data, etc., for the operation and maintenance of the wind turbine.

Further, it is possible to calculate each element value using various domains (time, conversion of time into FFT, conversion of time into enveloped FFT) when the breakdown of the wind turbine is detected.

Further, it is possible to confirm the basic specification and the current status of the on-site parts and facilities based on the graphic user interface (GUI) and confirm the components status, the tool status, or the like in real time.

Those skilled in the art will appreciate that since various modifications and alterations may be made without departing from the spirit or essential feature of the present disclosure, the above-mentioned embodiments are not restrictive but are exemplary in all aspects. It should be interpreted that the scope of the present invention is defined by the following claims rather than the above-mentioned detailed description and all modifications or alterations deduced from the meaning, the scope, and equivalences of the claims are included in the scope of the present disclosure.

What is claimed is:

1. A wind farm supervision monitoring system for supervising and managing a plurality of wind farms, in which each one of the plurality of wind farms includes at least one wind turbine and a site server including a plurality of site servers that corresponds to the plurality of wind farms and providing supervisory control and data acquisition (SCADA) data and condition monitoring system (CMS) data using a management control for each wind turbine of each wind farm, the wind farm supervision monitoring system comprising:

an information processing apparatus including a data collection unit, an abnormality status detection unit, a wind data management unit, and a supervision unit, wherein:

the data collection unit is connected to a bus of the information processing apparatus and is configured to be connected in parallel to each site server of the plurality of site servers, the data collection unit configured to set wind turbine conditions for each wind turbine, the wind turbine conditions including parameters of wind speed and wind direction, and collect the CMS data of each wind turbine respectively from the site servers of the plurality of site servers when each wind turbine meets the set wind turbine conditions;

the abnormality status detection unit is connected to the bus of the information processing apparatus and is configured to detect an abnormality status of each wind turbine based on the collected CMS data, and issue an alarm based on the detected abnormality status;

the wind data management unit is connected to the bus of the information processing apparatus and is configured to monitor performance of each wind turbine and thereby early detect a fault of each wind turbine based on at least one of the CMS data of each wind turbine collected by the data collection unit and the abnormality status of each wind turbine detected by the abnormality status detection unit; and the supervision unit is connected to the bus of the information processing apparatus and is configured to manage a turbine operation status and operation and maintenance (O & M) of each wind turbine, provide information for establishing an operation and maintenance plan for the detected abnormality status of the wind turbine, establish the operation and maintenance plan by collecting an early alarm, work history, a weather forecast, and component and tool status information using the SCADA data and the CMS data provided from the at least one site server, automatically issue a work ticket suggesting O & M work to be performed based on the established operation and maintenance plan, set a default period for performing O & M work at a plurality of sites corresponding to the plurality of wind farms, readjust the set period depending on the weather forecast for a corresponding site of the plurality of sites and on a location and availability of components and tools required for the O & M work to be performed according to the issued work ticket, and select, based on the collected work history, O & M work that is most frequently performed for each site of the plurality of sites.

2. The wind farm supervision monitoring system of claim 1, wherein the information processing apparatus further comprises:
a user interface unit connected to the bus of the information processing apparatus and configured to visually display locations of each site for the at least one wind farm on a map, display a live turbine operation status, an operating ratio, and availability of each wind turbine by a dashboard menu, display the information on each wind farm by a navigation menu, and display a turbine error of each wind turbine, the early alarm, the work history, and helpdesk function by an alarm and event menu.

3. The wind farm supervision monitoring system of claim 1, wherein for the wind O & M, the supervision unit is configured to perform a function about component/spare management, work plan/actual, cooperative work, manual/guarantee status management, tool/equipment management, and helpdesk reply of each wind turbine.

4. The wind farm supervision monitoring system of claim 1, wherein the supervision unit is further configured to:
receive a registration of a work record corresponding to the work ticket, and
perform a cooperative work for the customer request and answer of a helpdesk.

5. The wind farm supervision monitoring system of claim 4, wherein for the operation and maintenance (O & M) plan, the supervision unit determines one of a run to failure that performs maintenance after the operation until a major part breaks, a periodic maintenance that periodically performs maintenance for a predetermined period, and a status based maintenance that acquires a facility status based on a facility diagnosis technology or a status monitoring technology to early detect a fault and tracks the progress to predict the next progress to thereby perform the operation and maintenance at a specific time.

6. The wind farm supervision monitoring system of claim 2,
wherein the dashboard menu includes an estimation function, a status function, and a configuration function,
wherein the estimation function includes a management function and a cost function,
wherein the management function includes a status about the number of turbines, the number of wind farms, the number of countries, the number of failures, mean time to repair (MTTR), and mean time between failure (MTBF), accessibility to each site, the number of spare components per each site, and periodic maintenance for each turbine,
the status function includes a network function and a repository function, and
the configuration function sets a wind speed, a wave height, and priority and a threshold value of equipment including a network and a hard disk.

7. The wind farm supervision monitoring system of claim 1, wherein the supervision unit is further configured to:
perform a control by a component management menu, a mobile application menu, and a configuration menu, for the operation and maintenance,
perform a function of inquiring a work history for each part, a component status, a manual, a report card, and a term of guarantee and confirming a location of a component, for the component management menu,
provide a supervision, operation and maintenance, and helpdesk function so that a mobile terminal confirms an operation status of the wind turbine, for the mobile application menu, and
provide a location function of adding, modifying, and deleting information on an area, a country, a site, and a turbine, for the configuration menu.

8. The wind farm supervision monitoring system of claim 7, wherein for plan maintenance, corrective maintenance, and prediction maintenance,
the work history includes a work plan function of inquiring and registering a work plan, a work record function of inquiring a work record input to the issued work ticket, and an equipment tool function of inquiring equipment and tool used for work,
the components status inquires an inventory status of spare parts by site and requests a purchase and a delivery of components,
the manual includes a DDMS function of registering and inquiring a DDMS document and an EIM function of registering and inquiring an EIM document, and
the report card and the term of guarantee include a function of inquiring a report card and a term of guarantee of components.

9. The wind farm supervision monitoring system of claim 7, wherein the mobile application menu confirms an operation status of the wind turbine using a mobile terminal through the monitoring function, and enables an in-house staff or a worker of a cooperative firm to register a work record using a mobile terminal when the work ticket is issued through the O & M function, and registers questions or issue matters of the turbine and write history management using a mobile terminal through the helpdesk function.

10. The wind farm supervision monitoring system of claim 7,
wherein the component management menu manages new warehousing and shipping, a turbine model, and a components status and includes inventory management, turbine management, database (DB) management, and setting management,
wherein the inventory management includes a machine component warehousing and shipping function of inquiring a warehousing and shipping history of a machine component and an electronic component warehousing and shipping function of inquiring a warehousing and shipping history of an electronic component,
the turbine management performs a turbine classification system function of inquiring a turbine classification system through on a model management menu, a turbine model function of adding, modifying and inquiring the turbine model, and a component model function of adding, modifying, and inquiring a component model and inquires a turbine status based on a turbine status menu,
the DB management adds, modifies, and inquires equipment information using an equipment DB menu, adds, modifies, and inquires component warehouse information using a warehouse DB menu, adds, modifies, and inquires supplier information using a supplier DB menu, or adds, modifies, and inquires tool information using a tool DB menu, and
the setting management includes a model setting menu for managing model setting, a notification setting menu for setting items to be notified through e-mail and SMS, an account setting menu for managing an account of a component management user, and an authority setting menu for setting authority for the component management user.

11. The wind farm supervision monitoring system of claim 7, wherein the component management menu includes a QR code menu for managing QR code information input from a cooperative firm and providing a user interface (UI) that issues the QR code, and the mobile application menu recognizes shipping information when the components are shipped from the cooperative firm, inputs the recognized shipping information to a database through a mobile terminal, and connects the previously input component information to the turbine of the corresponding site when the turbine is assembled.

12. The wind farm supervision monitoring system of claim 2, wherein the helpdesk function is to display latest writings of each bulletin board on a home screen in a card and list form and perform a unified search thereon and includes an official announcement menu, a frequently asked questions (FAQ) menu, a customer support menu, the report menu, and a setting menu, the official announcement menu allows a manager to register announcement writing and inquires or confirms an official announcement posted by the manager, the frequently asked questions (FAQ) menu inquires or confirms a question posted by the manager, the customer support menu posts or confirms a customer related content, the report menu includes a periodic report function of registering, modifying, and inquiring a periodic report and a prediction report function of registering, modifying, and inquiring a prediction report, and the setting menu includes a user setting function of adding, modifying, or inquiring a helpdesk user or setting authority by user.

13. The wind farm supervision monitoring system of claim 2, wherein the user interface unit includes an overview menu and a setting menu, wherein the overview menu represents a collection status of the SCADA and CMS data of the registered turbines using a turbine status function, represents a live system status using a diagnosis function, or starts data-linking with a system monitoring and supervision unit using an acquisition start function, the setting menu displays information of currently registered turbines using a turbine list function, sets an interval time at which a system monitoring item data is transmitted to the supervision unit using a diagnosis setting function, selects and changes a hard disk (HDD) of which the consumed amount needs to be checked, sets a process name monitoring a process operation status using a process detect setting function, sets a process path for forcibly and automatically restarting a process, sets an auto start when an operation is not performed during the process monitoring, and sets a database access IP address, a database access port number, a database access SID or data source, a database access ID, a database access password using a database setting function.

14. The wind farm supervision monitoring system of claim 2, wherein the wind data management unit manages a live data menu, a recorded data menu, an analysis menu, a statistics menu, and a performance menu, wherein the live data menu displays live data of the turbine, the recorded data menu displays information corresponding to an error photo and an error trace and displays a day counter data, a day counter status data, a total counter data, a total counter status data, and a status message for a PLC status change, the analysis menu performs a normal analysis using a trend analysis function, analyzes raw data using a time-FFT analysis function, or analyzes smart shield data using an early detect function, the statistics menu analyzes an occurrence frequency of turbines within a wind farm for a specific tag using an accumulated chart function, analyzes a change in data in response to a wind direction and locations of nacelle using a wind chart function, displays a heat map chart for confirming weekly average data for the turbine within the wind farm using a turbine heat map chart function, or analyzes each error occurrence frequency of the turbine using an error chart function, and the performance menu displays data of generation in response to a wind speed of the turbine using a power curve function or displays data for vibration of the turbine using a vibration function.

15. The wind farm supervision monitoring system of claim 1, wherein the data collection unit includes an overview menu and a setting menu, wherein the overview menu displays a turbine status currently connected to a PLC using a turbine status function or start a connection to the PLC and an acquisition of data based on the set information using an acquisition start function, and the setting menu displays or modifies a turbine list including modbus connection information of the PLC using a turbine information function, adds a turbine, deletes connection information to the turbine selected from a current list (deletes turbine), sets an IP of a TCP listener receiving a command for collecting raw data from a data manager using a TCP setting function (listens IP), or sets an IP port of the TCP listener receiving a command for collecting the raw data from the data manager (listens port).

* * * * *